Patented Oct. 3, 1922.

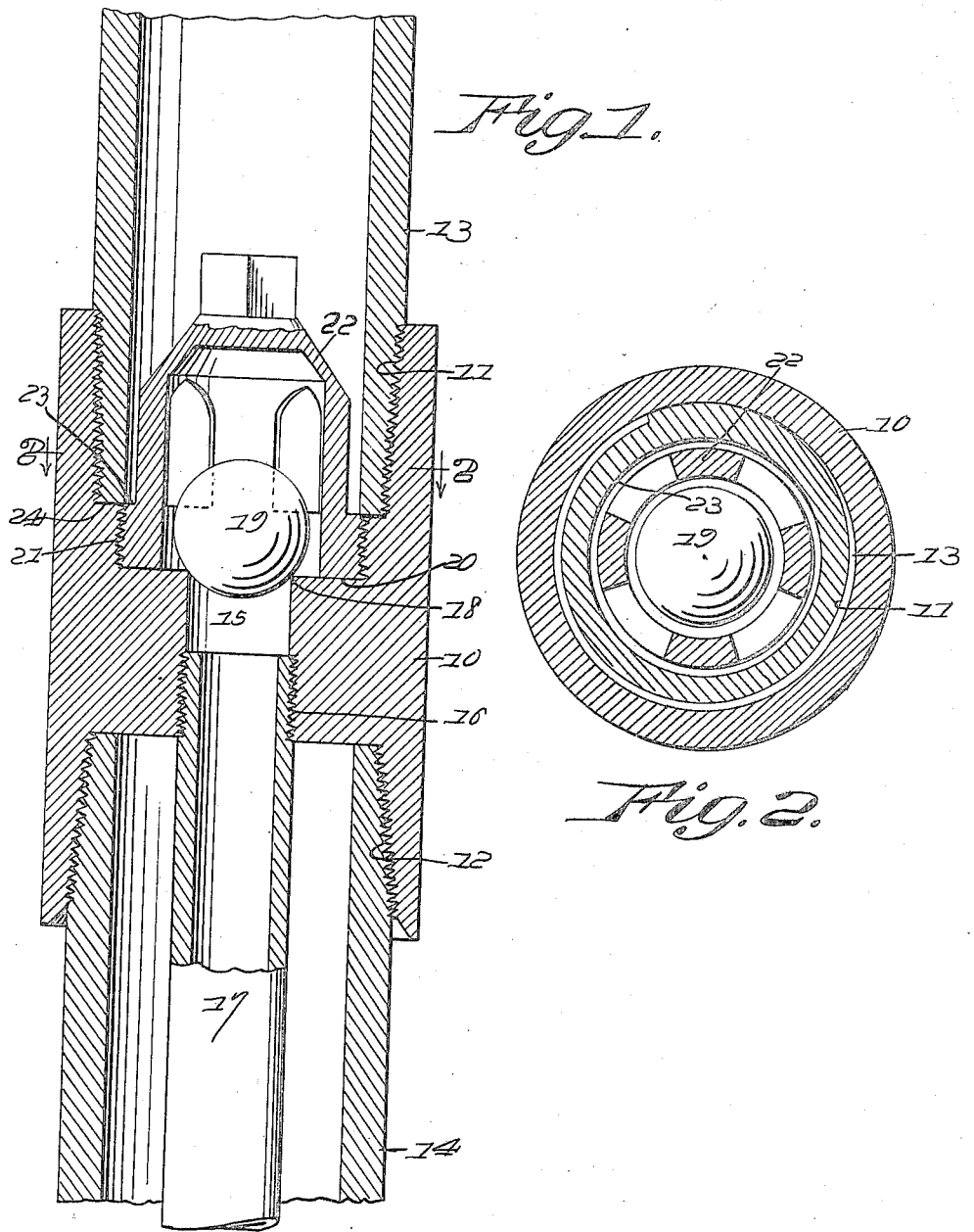

1,430,986

UNITED STATES PATENT OFFICE.

JAMES F. HALLMAN, OF OILTON, OKLAHOMA.

STANDING-VALVE COLLAR.

Application filed September 1, 1921. Serial No. 497,764.

*To all whom it may concern:*

Be it known that I, JAMES F. HALLMAN, a citizen of the United States of America, residing at Oilton, in the county of Creek and State of Oklahoma, have invented new and useful Improvements in Standing-Valve Collars, of which the following is a specification.

The object of the invention is to provide a simple and improved means for mounting the standing valve in a deep well pump outfit as a means of guarding against leakage, looseness, displacement and other inconveniences incident to the use of conventional forms of standing valve mountings and necessitating the withdrawal of the tubing in order to readjust or repair or replace the parts, and hence involving a great loss of time and heavy expense due to the enforced idleness of the pump; and more particularly to provide a collar standing valve wherein the valve with its cage and related parts is mounted in and carried by a collar adapted to form a coupling between the working barrel and the pipe anchor under such conditions as to provide against any possibility of a detachment or displacement of the elements due to the jarring of the apparatus; and with these objects in view the invention consists in a construction and combination of parts of which a preferred embodiment is shown in the accompanying drawings, wherein:

Figure 1 is a sectional view of a standing or foot valve mounting embodying the invention.

Figure 2 is a cross sectional view of the same on the plane indicated by the line 2—2 of Figure 1.

The device embodies a collar 10 interiorly threaded terminally as shown at 11 and 12 respectively for engagement with the adjacent terminals of the working barrel 13 and the pipe anchor 14 and also having a reduced axial bore 15 approximately midway of the length of the coupling with a threaded seat 16 for engagement by the gas anchor pipe 17.

The reduced bore of the collar is provided at its upper end with a seat 18 for the wall valve 19 above which the collar is counter bored or enlarged to provide a shoulder 20 and a threaded seat 21 for engagement by the valve cage 22. As in the ordinary construction the valve cage is provided with an exterior shoulder 23, and this shoulder is arranged to lie substantially in the plane of a shoulder 24 formed in the bore of the collar to provide the threaded seat 11 for the working barrel, so that the lower end of the working valve engaged with the threaded seat 11 overlaps and has a bearing upon the shoulder 23 to act as a lock to maintain the cage in its seat 21 and with its lower end in contact with the shoulder 20.

Thus without rings or packing or other devices ordinarily deemed necessary in connection with standing valve mountings and subject to wear, abrasion, cutting, rotting and displacement there is by the construction indicated afforded a retaining means for the valve which ensures a prompt seating thereof on the down stroke of the pump and hence the maximum efficiency of the pump mechanism.

Having described the invention, what is claimed as new and useful is:—

A standing valve collar having terminal threaded seats for respective reception of the working barrel and pipe anchor and a reduced intermediate bore provided at its upper end with a seat for the ball valve, and a valve cage threaded into a counterbored seat adjacent to the valve seat, and provided with an exterior shoulder overlapped by the inner extremity of the working barrel.

In testimony whereof he affixes his signature.

JAMES F. HALLMAN,